UNITED STATES PATENT OFFICE.

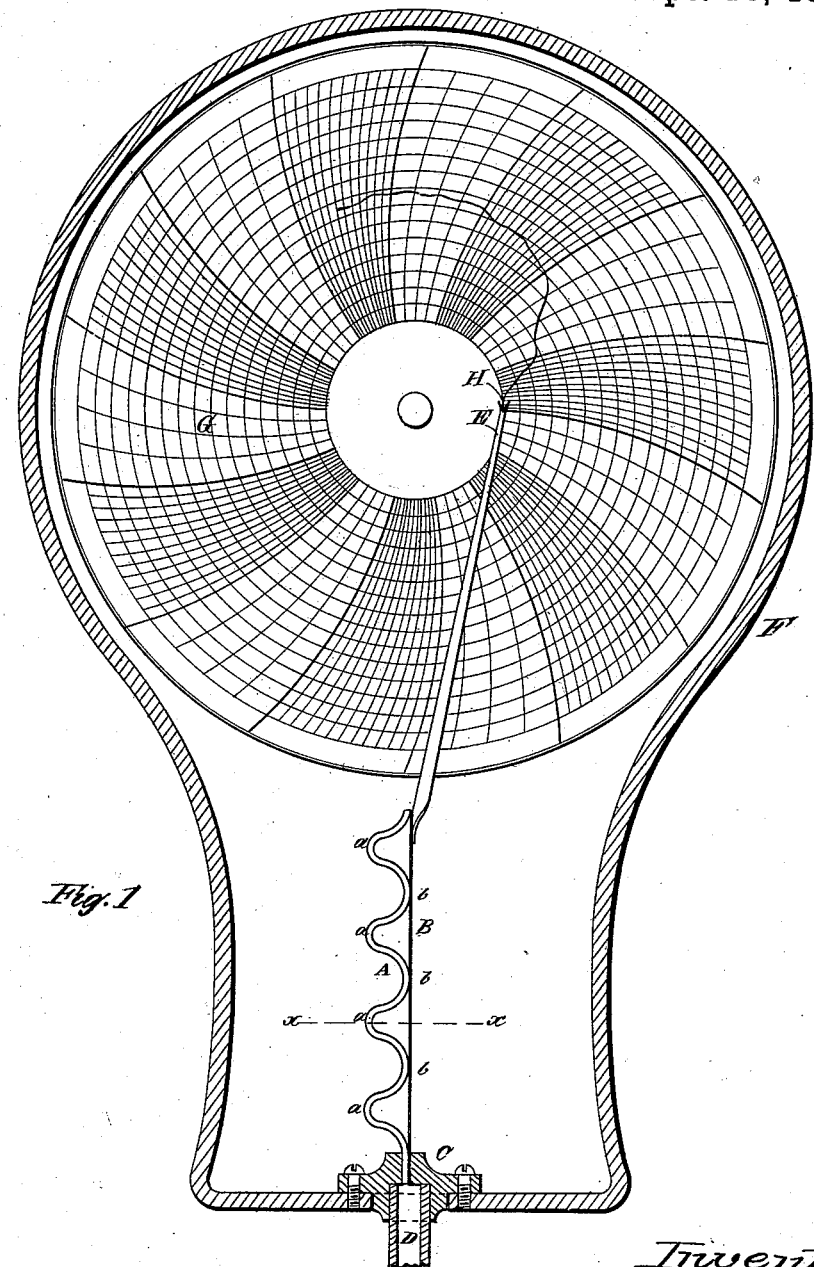

WILLIAM H. BRISTOL, OF HOBOKEN, NEW JERSEY.

PRESSURE INDICATOR AND RECORDER.

SPECIFICATION forming part of Letters Patent No. 389,635, dated September 18, 1888.

Application filed May 17, 1888. Serial No. 274,121. (No model.)

*To all whom it may concern:*

Be it known that I, WILLIAM H. BRISTOL, a citizen of the United States, residing at Hoboken, in the county of Hudson and State of New Jersey, have invented certain new and useful Improvements in Pressure Indicators and Recorders, of which the following is a specification, reference being had to the drawings accompanying and forming a part of the same.

Primarily the object of this invention is to produce a pressure indicator or recorder in which the movement due to variations of pressure shall be positive and certain and of such range or extent for giving variations that the usual or all devices for multiplying the movement may be dispensed with. The principle which is involved in the construction and mode of operation of the devices which I have constructed for the special purpose of indicating or recording steam, liquid, or air pressure may be applied without material changes or substantial departure from the invention to other purposes, as will be hereinafter seen. Hence in describing my invention as embodied in a pressure-indicator I wish to be understood as including in my invention the same apparatus as applied to barometers, thermometers, or other analogous devices in which either the direct influence of a pressure, such as that of the atmosphere or that of an expansible body when exposed to varying temperatures, is the cause of their operation.

Heretofore a pressure-indicator has been constructed by forming by electro-deposition a tube closed at one end and adapted to be attached to a boiler or other receptacle the pressure in which it is desired to indicate. One side or edge of this tube was formed with corrugations, while the other was straight, in consequence of which an internal pressure imparted a tendency to the corrugated side to lengthen. This tendency to elongate, being restrained by the straight portion of the tube, produced a deflection of the whole, which was utilized to indicate the pressure.

My invention is an improvement in mechanism of this general character. In carrying out my invention I form a comparatively flat metallic tube which is bent into an approximately-sinuoidal shape and closed at one end. This tube I lay upon a flat flexible strip of the same metal or one which has the same coefficient of expansion and unite the two at a number of points.

The tube may be considered as composed of a series of Bourdon springs or tubes connected together end for end, and if the bends have all the same radius of curvature it is clear that the tendency of each spring to straighten out under internal pressure will collectively impart to the structure a tendency to elongate. This component of elongation is converted into a side deflection by the restraining influence of the flexible strip. This structure in itself forms a new and useful improvement in the art, and I claim it as a part of my invention. I further improve the device, however, by making the bends in the pressure-tube or hollow spring with a greater radius of curvature on one side than on the other; and I have found the best results to follow when the flexible strip is united to the bends of greater radius, for although such a construction of the tube produces a deflection in itself and the strip is not absolutely essential, still its presence is necessary to obtaining good results. When the tube is bent in the manner described, each bend or section (for the whole may be considered as made up of short sections or independent Bourdon springs of alternately greater and less radius of curvature) tends not only to elongate but to bend over to one side more than the other, the wider bends having a tendency under applied pressure to produce a side deflection, while all the bends combine to produce an elongation. This component of elongation is converted and combined with the natural side deflection by means of the flexible strip, which deflection, even with a tube of a few inches, is sufficient to give good readings without any additional multiplying devices.

Referring now to the drawings, Figure 1 is a plan view of my improved device applied to a recording device. Fig. 2 is a section on line *x x* of the tube and the attached flexible strip.

A indicates the tube, which may be brass or other metal. It is bent in the sinuous form shown, with a wider curvature at *b b* on one side than at *a a* on the other. Its free end is closed, and a flexible metallic strip, B, which has the same coefficient of expansion, is soldered or otherwise secured to the parts b b. The tube is secured in a base, C, and communicates with a tube, D, by which it is connected with the boiler.

To the end of the tube and strip I attach a pointer, E. In the present instance I have shown the tube mounted in a case, F, with the pointer in position to move laterally over a properly-graduated card, G, which is revolved by clock-work, as is usual in registering thermometers and other similar instruments. The pointer may be provided with a suitable inking device, H.

The number of sections or bends will depend upon the uses to which the apparatus is to be applied and the range of movement desired. Any number from one up may be used. It is preferable to make the tube in a single piece, as this may be very easily done, and all joints are avoided, and its size and strength will be varied according to the purpose to which it is to be applied.

What I claim is—

1. A sinuous tube forming a series of Bourdon springs and closed at the end, in combination with a flexible metallic strip secured to the bends of said tube, as and for the purpose set forth.

2. A sinuous tube forming a series of Bourdon springs and closed at one end, in combination with a flexible metallic strip, of a metal having the same coefficient of expansion, a pointer secured to the end of the tube, and a scale over which said pointer may move, as set forth.

3. A sinuous tube the bends on one side of which have a greater radius of curvature than those on the other, in combination with a pointer for indicating by the deflection of the tube variations of pressure in the same, as set forth.

4. A sinuous tube the bends on one side of which have a greater radius of curvature than those on the other, in combination with a flexible strip secured to the tube at intervals on the side of the wider curves, as herein set forth.

WILLIAM H. BRISTOL.

Witnesses:
FRANK B. MURPHY,
FRANK E. HARTLEY.